July 13, 1965   E. LATTA   3,194,994
ELECTRIC MOTOR
Filed April 19, 1962

INVENTOR.
EDWARD LATTA
BY
Bayard H. Michael
ATTORNEY

United States Patent Office 3,194,994
Patented July 13, 1965

3,194,994
ELECTRIC MOTOR
Edward Latta, Owosso, Mich., assignor to Controls Company of America, Schiller Park, Ill., a corporation of Delaware
Filed Apr. 19, 1962, Ser. No. 188,809
6 Claims. (Cl. 310—68)

This invention relates to electric motors and has as a general object the provision of an electric motor which will operate equally well on either direct or alternating current.

Another specific object of this invention is incorporate means for rectifying alternating current as an integral part of the interior structure of an electric motor.

A further, more specific, object of this invention is to provide an arrangement whereby current is rectified just prior to passage into the motor windings.

The novel features of this invention are set forth in the appended claims. The invention itself, together with additional objects and advantages thereof, will be more clearly understood from a reading of the following description in connection with the accompanying drawings wherein a preferred embodiment and an alternative embodiment are illustrated and in which:

In accordance with this invention diodes 10, 12, 14 and 16 are mounted within and as a part of the interior structure of an electric motor. Since the electric motor construction is well known in the art, only the brush card assembly has been illustrated; however, the invention is illustrated as it would be incorporated in a permanent magnet-type motor but it will be appreciated that it is not limited to use with permanent magnet motors and can be incorporated in other types of electrical motors as well. Preferably the diodes are mounted on a brush card 18 of an electric motor, the brush card providing a convenient mounting for the diodes and, further, positioning the diodes to rectify current just prior to passage into the motor windings. Therefore, as will appear more clearly hereinafter, the motor windings will always operate on direct current, regardless of the current applied to the motor leads.

Figures 1, 2:
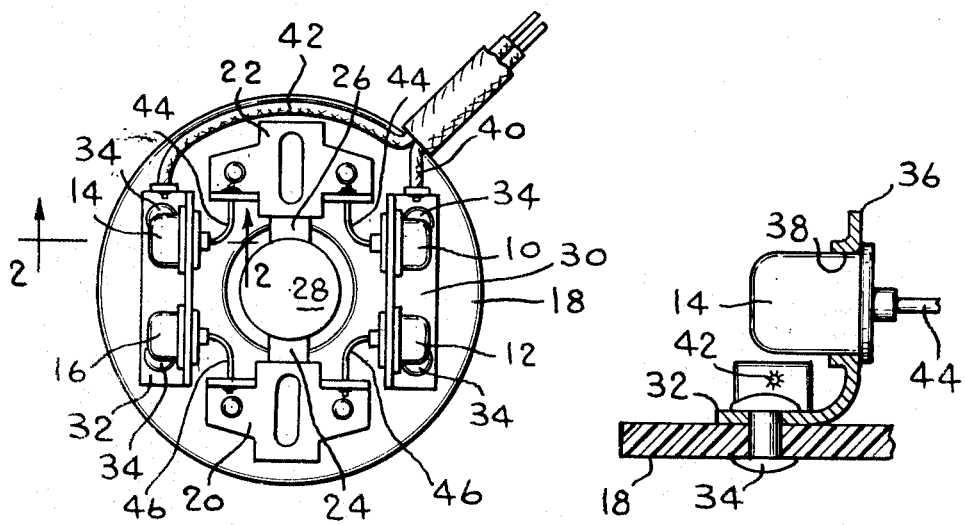
FIG. 1 illustrates the preferred embodiment of this invention.
FIG. 2 is a cross sectional view taken along lines 2—2 of FIG. 1.

In FIG. 1 brush card 18 is illustrated as having brush tubes 20 and 22 mounted thereon. The brush tubes 20 and 22 support brushes 24 and 26, respectively, in engagement with an armature 28 of the electric motor. A pair of L-shaped electrically conductive brackets 30 and 32 are suitably connected to the brush card, as by rivets 34. A portion 36 of each of the brackets 30 and 32 extends laterally of the brush card and is provided with a pair of extruded apertures 38. The diodes are mounted in respective ones of the apertures by a press fit. Diodes 10 and 12 are mounted on bracket 30 and diodes 14 and 16 are mounted on bracket 32, the brackets establishing an electrical connection between the diodes.

Figure 3:
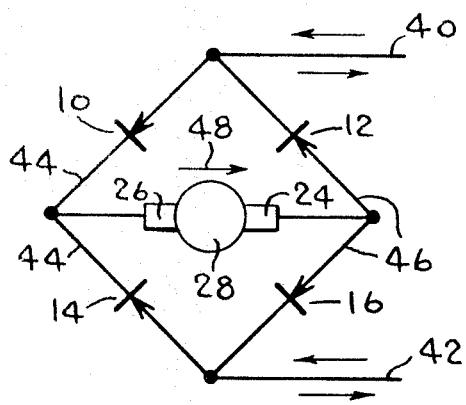
FIG. 3 is a schematic diagram for the embodiment of FIG. 1.

Motor leads 40 and 42 are electrically connected to brackets 30 and 32, respectively, and, through the brackets, to the diodes. Diodes 10 and 14 are electrically connected to brush tube 22 through leads 44 and diodes 12 and 16 are electrically connected to brush tube 20 through leads 46. As can be seen in FIG. 3, in the preferred embodiment a bridge circuit is formed with the diodes so arranged that diodes 10 and 14 permit current to flow toward the brushes and diodes 12 and 16 permit current to flow away from the brushes. This arrangement provides full wave rectification so that whether the motor leads are connected to an alternating or direct current source, the current through the motor windings will always be in one direction, in this instance, the direction of the arrow 48.

By suitably connecting the field coil leads (not shown) of the motor on the brush card and in the electrical circuit just described, the brush card assembly can be incorporated in either a series or a shunt connected motor.

Figure 4:
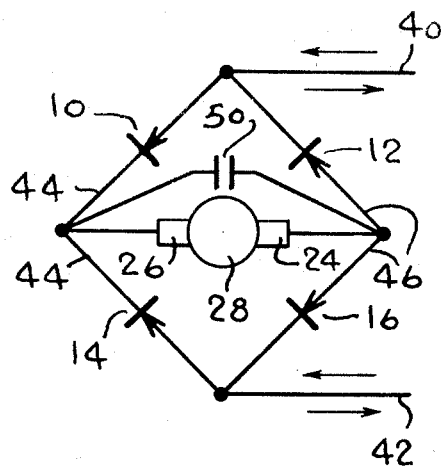
FIG. 4 is a schematic diagram of an alternative embodiment.

An electric motor constructed in accordance with this invention and run on direct current and 60 cycle and 400 cycle alternating current, has exhibited performance which did not vary more than five percent for the various power sources. The variance in performance on A.C. is slightly lower than on D.C., but is so small as to be practically negligible. However, if desired, a suitable capacitance element 50 can be connected in the circuit as illustrated in FIG. 4. With the capacitance added, performance on A.C. and D.C. is substantially identical.

Although this invention has been illustrated and described as utilizing full wave rectification, it should be understood that a single diode can be used to give half wave rectification. However, the full wave rectification arrangement is preferred, as it results in smoother and more efficient operation of the electric motor.

The discussion of this invention with relation to particular embodiments thereof has been for illustrative purposes only, and should not be taken by way of limitation. Accordingly, it is intended in the appended claims to cover all modifications and embodiments of this invention as fall within the true spirit and scope thereof.

What I claim is:

1. In an electric motor the combination comprising, a brush card, at least two brushes mounted on said brush card, a pair of electrically conductive brackets mounted on said brush card, a pair of diodes mounted on each of said brackets, whereby said brushes and diodes are mounted on a single brush card, one of said diodes in each of said pairs electrically connected to and arranged to conduct electricity toward one of said brushes and the other of said diodes in each of said pairs electrically connected to and arranged to conduct electricity away from the other of said brushes, and a motor lead electrically connected to each of said brackets.

2. The combination of claim 1 including an electrical capacitive element electrically connected across said brushes.

3. In an electric motor the combination comprising, a brush card, at least two brushes mounted on said brush card, first and second pairs of diodes mounted on said brush card, whereby said brushes and diodes are mounted on a single brush card, the diodes in each of said pairs being electrically interconnected, one of said diodes in each of said pairs electrically connected to and arranged to conduct electricity toward one of said brushes and the other of said diodes in each of said pairs electrically connected to and arranged to conduct electricity away from the other of said brushes, and a motor lead electrically connected to each of said pairs of diodes.

4. In an electric motor the combination comprising, a brush card, at least two brushes mounted on said brush card, first and second pairs of diodes mounted on said brush card, whereby said brushes and diodes are mounted on the same brush card, means for electrically connecting said diodes to said brushes in a bridge circuit to produce full wave rectification of current directed to said brushes, and motor leads electrically connected, one to each pair of said diodes.

5. In an electric motor the combination comprising, a brush card at least two brushes mounted on said brush card, rectifying means mounted on said brush card so that said brushes and rectifying means are mounted on the same brush card, said rectifying means electrically connected to said brushes in a bridge circuit for providing full wave rectification of current directed to said brushes, and motor leads connected to said rectifying means to supply current to said motor.

6. In an electric motor the combination comprising, a brush card, at least two brushes mounted on said brush card, rectifying means electrically connected to said brushes for rectifying current directed to said brushes, means for mounting said rectifying means on said brush card so that said brushes and rectifying means are mounted on the same brush card, and motor leads connected to said rectifying means to supply current to said motor.

References Cited by the Examiner
UNITED STATES PATENTS

| | | | |
|---|---|---|---|
| 2,558,086 | 6/51 | Herchenroeder | 318—347 |
| 2,558,094 | 6/51 | King | 318—347 |
| 2,661,452 | 12/53 | Curry et al. | 318—347 |
| 2,947,895 | 8/60 | Wray | 310—239 |
| 3,106,656 | 10/63 | Merriam | 310—244 |

MILTON O. HIRSHFIELD, *Primary Examiner*.